United States Patent
Zhu et al.

(10) Patent No.: US 10,784,759 B2
(45) Date of Patent: Sep. 22, 2020

(54) LINEAR VIBRATING MOTOR

(71) Applicant: GOERTEK INC., Weifang, Shandong (CN)

(72) Inventors: Yueguang Zhu, Weifang (CN); Dezhang Shi, Weifang (CN)

(73) Assignee: GOERTEK INC., Weifang, Shandong (CN)

( * ) Notice: Subject to any disclaimer, the term of this patent is extended or adjusted under 35 U.S.C. 154(b) by 75 days.

(21) Appl. No.: 16/083,785

(22) PCT Filed: Jun. 3, 2016

(86) PCT No.: PCT/CN2016/084797
§ 371 (c)(1),
(2) Date: Sep. 10, 2018

(87) PCT Pub. No.: WO2017/152525
PCT Pub. Date: Sep. 14, 2017

(65) Prior Publication Data
US 2019/0081544 A1 Mar. 14, 2019

(30) Foreign Application Priority Data

Mar. 11, 2016 (CN) .......................... 2016 1 0141498

(51) Int. Cl.
*H02K 33/02* (2006.01)
*H02K 33/16* (2006.01)

(52) U.S. Cl.
CPC ............. *H02K 33/16* (2013.01); *H02K 33/02* (2013.01); *H02K 2211/03* (2013.01)

(58) Field of Classification Search
CPC ........ H02K 33/00; H02K 33/02; H02K 33/06; H02K 33/16; H02K 33/04; H02K 33/08; H02K 33/10; B06B 1/04; B06B 1/1045

(Continued)

(56) References Cited

U.S. PATENT DOCUMENTS 6,608,411 B2 * 8/2003 Horng ...................... H02K 3/26
310/207
6,724,106 B1 * 4/2004 Horng ................... F04D 25/066
310/156.01

(Continued)

FOREIGN PATENT DOCUMENTS

CN 102710052 A 10/2012
CN 103296855 A 9/2013

(Continued)

OTHER PUBLICATIONS

Lee, Machine Translation of KR20120033043, Apr. 2012 (Year: 2012).*

(Continued)

*Primary Examiner* — Quyen P Leung
*Assistant Examiner* — Eric Johnson
(74) *Attorney, Agent, or Firm* — Saliwanchik, Lloyd & Eisenschenk

(57) ABSTRACT

The present application relates to the technical field of electronics and provides a linear vibrating motor. The linear vibrating motor comprises a motor housing, a stator, a vibrator and an elastic support member through which the vibrator is suspended in the motor housing, wherein the elastic support member is configured to support the vibrator and to provide an elastic restoring force; the stator comprises a coil and a circuit board; the circuit board comprises a circuit connecting end, a coil securing end and a transitional connecting plate through which the circuit connecting end and the coil securing end are connected; and a coil securing plate that is not co-planer with the transitional connecting plate is disposed on the coil securing end and fixedly connected to the motor housing. The circuit board is compact in structure and does not take up the internal space of the motor housing.

7 Claims, 2 Drawing Sheets

(58) Field of Classification Search
USPC .......................................................... 310/29
See application file for complete search history.

(56) References Cited

U.S. PATENT DOCUMENTS

| | | | | |
|---|---|---|---|---|
| 2010/0231060 | A1* | 9/2010 | Bang | H02K 5/225 |
| | | | | 310/25 |
| 2011/0018365 | A1* | 1/2011 | Kim | B06B 1/045 |
| | | | | 310/17 |
| 2013/0076178 | A1* | 3/2013 | Kuroda | H02K 33/00 |
| | | | | 310/81 |
| 2017/0033666 | A1* | 2/2017 | Xu | H02K 33/16 |
| 2017/0033669 | A1* | 2/2017 | Xu | H02K 33/16 |
| 2019/0044425 | A1* | 2/2019 | Zu | H02K 33/18 |

FOREIGN PATENT DOCUMENTS

| | | | |
|---|---|---|---|
| CN | 103762815 A | | 4/2014 |
| CN | 204721193 U | | 10/2015 |
| CN | 105226909 A | | 1/2016 |
| CN | 204947873 U | | 1/2016 |
| CN | 205004932 U | | 1/2016 |
| CN | 105656274 A | | 6/2016 |
| CN | 205595993 U | | 9/2016 |
| JP | 2004104906 A | * | 4/2004 |
| JP | 2004104906 A | | 4/2004 |
| KR | 20120033038 A | * | 4/2012 |
| KR | 20120033043 A | * | 4/2012 |
| KR | 20130012441 A | * | 2/2013 |
| KR | 1020130012440 A | | 2/2013 |

OTHER PUBLICATIONS

Lee, Machine Translation of KR20120033038, Apr. 2012 (Year: 2012).*

Yamaguchi, Machine Translation of JP2004104906, Apr. 2004 (Year: 2004).*

Park, Machine Translation of KR20130012441, Feb. 2013 (Year: 2013).*

* cited by examiner

LINEAR VIBRATING MOTOR

CROSS REFERENCE TO RELATED APPLICATIONS

This application is a National Stage of International Application No. PCT/CN2016/084797, filed on Jun. 3, 2016, which claims priority to Chinese Patent Application No. 201610141498.2, filed on Mar. 11, 2016, both of which are hereby incorporated by reference in their entireties.

FIELD OF THE INVENTION

The present application belongs to the technical field of electronics, and in particular relates to a linear vibrating motor.

BACKGROUND OF THE INVENTION

With rapid development of portable consumer electronics at present, more and more consumers favor the electronics that are thinner and have better tactile experience. A linear vibrating motor is generally used as an actuator for the tactile experience and may play a system vibration feedback role. The development direction of thinning of the electronics determines that an elastic support member has to be improved by flattening.

Most linear vibrating motors mainly comprise a motor housing, a vibrator and a stator. The vibrator comprises an elastic support member. The linear vibrating motor realize overall vibration mainly through the elastic support member which is commonly in the format of a spring or an elastic sheet. The elastic support member in the format of the spring or the elastic sheet is mainly designed based on the internal space of the linear vibrating motor. However, at present, the space utilization ratio of a closed space formed by the motor housing is relatively lower. The forming process is complicated. The cost is relatively higher.

SUMMARY OF THE INVENTION

An objective of the present application is to provide a linear vibrating motor to solve the problems in the prior art that the space utilization ratio of a closed space formed by the motor housing is relatively lower, the forming process is complicated and the cost is relatively higher.

The present application is realized as follows. The linear vibrating motor comprises a motor housing, a stator, a vibrator and an elastic support member through which the vibrator is suspended in the motor housing. The elastic support member is configured to support the vibrator and to provide an elastic restoring force. The stator comprises a coil and a circuit board. The circuit board comprises a circuit connecting end, a coil securing end and a transitional connecting plate through which the circuit connecting end and the coil securing end are connected. A coil securing plate that is not co-planer with the transitional connecting plate is disposed on the coil securing end and fixedly connected to the motor housing.

As an improved solution, the number of the coil securing plates is two. The two coil securing plates are disposed at two sides of the transitional connecting plate respectively.

As an improved solution, the coil securing plates are perpendicular to the transitional connecting plate.

As an improved solution, a bonding pad is disposed on the coil securing plate.

As an improved solution, the motor housing comprises a first lateral housing and a second lateral housing. The first lateral housing comprises a first lateral plate, as well as a second lateral plate and a third lateral plate that are disposed at two ends of the first lateral plates respectively. The second lateral housing comprises a fourth lateral plate, as well as a fifth lateral plate and a sixth lateral plate that are disposed at two ends of the fourth lateral plate respectively. The first lateral housing and the second lateral housing are fastened to form a closed space that accommodates the stator, the vibrator and the elastic support member.

As an improved solution, the first lateral plate and the fourth lateral plate are parallel to each other and are in parallel with a vibrating direction of the vibrator.

As an improved solution, the second lateral plate and the third lateral plate are parallel to each other. The fifth lateral plate and the sixth lateral plate are parallel to each other.

As an improved solution, the first lateral plate is docked with and perpendicular to the fifth lateral plate and the sixth lateral plate. The second lateral plate is docked with and perpendicular to the fourth lateral plate, the fifth lateral plate and the sixth lateral plate. The third lateral plate is docked with and perpendicular to the fourth lateral plate, the fifth lateral plate and the sixth lateral plate.

As an improved solution, the transitional connecting plate is secured to the fourth lateral plate. The circuit connecting end is located on the outer side of the closed space formed by the first lateral housing and the second lateral housing. The fourth lateral plate is provided with an extending portion configured to support the circuit connecting end.

As an improved solution, the vibrator comprises a mass block and a magnet. A mounting hole configured to mount the magnet is formed in the mass block.

The linear vibrating motor comprises a motor housing, a stator, a vibrator and an elastic support member through which the vibrator is suspended in the motor housing. The elastic support member is configured to support the vibrator and to provide the elastic restoring force. The stator comprises the coil and the circuit board. The circuit board comprises the circuit connecting end, the coil securing end and the transitional connecting plate through which the circuit connecting end and the coil securing end are connected. The coil securing plate that is not co-planer with the transitional connecting plate is disposed on the coil securing end and fixedly connected to the motor housing. The circuit board is compact in structure and does not take up the internal space of the motor housing. Thus, the utilization ratio of the inner space of the motor housing is increased. The process is simple. The cost is relatively lower.

1—elastic support member; 2—coil; 3—circuit board; 4—circuit connecting end; 5—coil securing end; 6—transitional connecting plate; 7—coil securing plate; 8—first lateral housing; 9—second lateral housing; 10—first lateral plate; 11—second lateral plate; 12—third lateral plate; 13—fourth lateral plate; 14—fifth lateral plate; 15—sixth lateral plate; 16—mass block; 17—magnet; 18—washer plate; 19—limiting block; 20—stopper.

DETAILED DESCRIPTION OF THE EMBODIMENTS

In order to make the objectives, technical solutions, and advantages of the present application clearer, the followings further describe the present application in detail with reference to the accompanying drawings and the embodiments. It should be understood that the specific embodiments described herein are merely used to explain but not to limit the present application.

Figure 1:
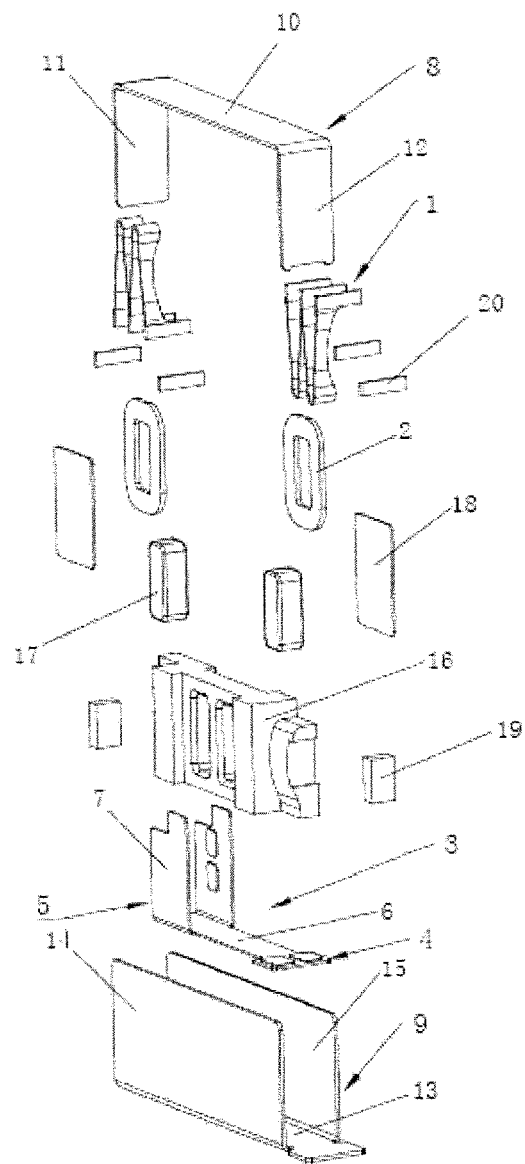
FIG. 1 is a schematic exploded view of a linear vibrating motor provided by the present application.

FIG. 1 is an exploded view of a linear vibrating motor provided by the present application and only shows portions related to the present application to facilitate explanation.

Figure 2:
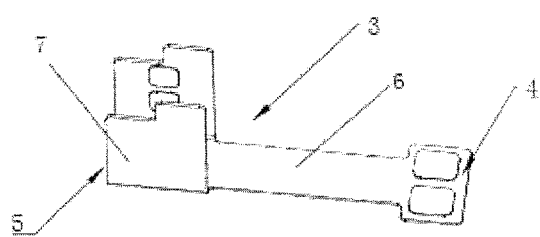
FIG. 2 is a schematic structural view of a circuit board provided by the present application.

With reference to FIG. 2, the linear vibrating motor comprises a motor housing, a stator, a vibrator and an elastic support member 1 through which the vibrator is suspended in the motor housing. The elastic support member 1 is configured to support the vibrator and to provide an elastic restoring force. The stator comprises a coil 2 and a circuit board 3. The circuit board 3 comprises a circuit connecting end 4, a coil securing end 5 and a transitional connecting plate 6 through which the circuit connecting end 4 and the coil securing end 5 are connected. A coil securing plate 7 that is not co-planer with the transitional connecting plate 6 is disposed on the coil securing end 5 and fixedly connected to the motor housing.

The circuit connecting end 4 is configured to be connected with a power supply at the periphery of the linear vibrating motor. The coil securing end 5 is configured to secure the coil 2

There may be one or two coil securing plates 7 that are disposed at two sides of the transitional connecting plate 6 respectively as shown in FIG. 1.

The two coil securing plates 7 are not co-polar with the transitional connecting plate 6 and form a certain angle with the transitional connecting plate 6. As shown in FIG. 1 and FIG. 2, the coil securing plates 7 and the transitional connecting plate 6 are perpendicular to each other, and certainly, may be disposed in other manners.

In the embodiment, a bonding pad (not marked) is disposed on the coil securing plate 7, such that the coil securing plate 7 may be conveniently secured.

Figure 3:
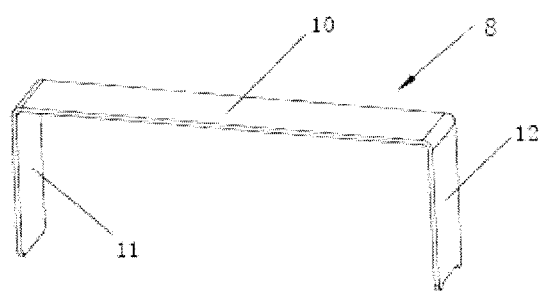
FIG. 3 is a schematic structural view of a first lateral housing provided by the present application.

As shown in FIG. 2 and FIG. 3, the motor housing comprises a first lateral housing 8 and a second lateral housing 9. The first lateral housing 8 comprises a first lateral plate 10, as well as a second lateral plate 11 and a third lateral plate 12 that are disposed at two ends of the first lateral plate 10 respectively. The second lateral housing 9 comprises a fourth lateral plate 13, as well as a fifth lateral plate 14 and a sixth lateral plate 15 that are disposed at two ends of the fourth lateral plate 13 respectively.

The first lateral housing 8 and the second lateral housing 9 are fastened to form a closed space that accommodates the stator, the vibrator and the elastic support member 1.

The first lateral plate 10 and the fourth lateral plate 13 are parallel to each other and are in parallel with the vibrating direction of the vibrator. As shown in FIG. 1, the first lateral plate 10 is an upper plate of the motor housing. The fourth lateral plate 13 is a lower plate of the motor housing. The two plates are opposite and parallel to each other.

The second lateral plate 11 and the third lateral plate 12 are parallel to each other, and as shown in FIG. 1, are two lateral plates, perpendicular to the vibrating direction of the vibrator, of the motor housing.

The fifth lateral plate 14 and the sixth lateral plate 15 are parallel to each other, and as shown in FIG. 1, are two lateral plates, parallel to the vibrating direction of the vibrator, of the motor housing.

Figure 4:
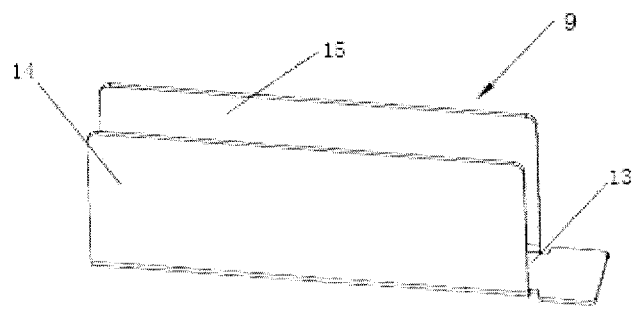
FIG. 4 is a schematic structural view of a second lateral housing provided by the present application.

As shown in FIG. 3 and FIG. 4, the first lateral plate 10 is docked with and perpendicular to the fifth lateral plate 14 and the sixth lateral plate 15.

The second lateral plate 11 is docked with and perpendicular to the fourth lateral plate 13, the fifth lateral plate 14 and the sixth lateral plate 15.

The third lateral plate 12 is docked with and perpendicular to the fourth lateral plate 13, the fifth lateral plate 14 and the sixth lateral plate 15.

In the present application, as shown in FIG. 1, the transitional connecting plate 6 is secured to the fourth lateral plate 13. The circuit connecting end 4 is located on the outer side of the closed space formed by the first lateral housing 8 and the second lateral housing 9. The fourth lateral plate 13 is provided with an extending portion (not marked) configured to support the circuit connecting end.

In the present application, the vibrator comprises a mass block 16 and a magnet 17. A mounting hole configured to mount the magnet 17 is formed in the mass block 16. The magnet 17 may be suspended and mounted in the mounting hole through a washer plate 18.

In the present application, a limiting block 19 is further disposed in the motor housing and limits vibration displacement of the vibrator.

Meanwhile, the elastic support member 1 may be of a elastic sheet or spring structure, for example, a spiral spring or an M-shaped elastic sheet. When the elastic support member 1 is a elastic sheet, a stopper 20 is disposed at a point of connection between the elastic sheet and the motor housing, as well as between the elastic sheet and the mass block 16, such that the connection stability may be enhanced.

In the present application, the linear vibrating motor comprises a motor housing, a stator, a vibrator and an elastic support member through which the vibrator is suspended in the motor housing. The elastic support member is configured to support the vibrator and to provide the elastic restoring force. The stator comprises the coil and the circuit board 3. The circuit board 3 comprises the circuit connecting end 4, the coil securing end 5 and the transitional connecting plate 6 through which the circuit connecting end 4 and the coil securing end 5 are connected. The coil securing plate 7 that is not co-planer with the transitional connecting plate 6 is disposed on the coil securing end 5 and fixedly connected to the motor housing. The circuit board 3 is compact in structure and does not take up the internal space of the motor housing. Thus, the utilization ratio of the inner space of the motor housing is increased. The process is simple. The cost is relatively lower.

The above descriptions are only preferred embodiments of the present application and are not intended to limit the present application. Any modification, equivalent replacement and improvement made within the spirit and principle of the present application should be included in the protection scope of the present application.

What is claimed is:

1. A linear vibrating motor, comprising a motor housing, a stator, a vibrator and an elastic support member through which the vibrator is suspended in the motor housing, wherein the elastic support member is configured to support the vibrator and to provide an elastic restoring force, the stator comprises two coils and a circuit board, the circuit board comprises a circuit connecting end, a coil securing end and a transitional connecting plate through which the circuit connecting end and the coil securing end are connected, and two coil securing plates that are not coplanar with the transitional connecting plate are disposed on the coil securing end and fixedly connected to the motor housing, wherein the motor housing comprises a first lateral housing and a second lateral housing, the first lateral housing comprises a first lateral plate, as well as a second lateral plate and a third lateral plate that are disposed at two ends of the first lateral plate, respectively, and the second lateral housing comprises a fourth lateral plate, as well as a fifth lateral plate and a sixth lateral plate that are disposed at two ends of the fourth lateral plate, respectively, wherein the first lateral housing and the second lateral housing are fastened to form a closed space that accommodates the stator, the vibrator, and the elastic support member, and wherein the two coil securing plates are disposed at two sides of the transitional connecting plate, parallel to the fifth lateral plate and the sixth lateral plate, and fixed to fifth lateral plate and the sixth lateral plate, respectively.

2. The linear vibrating motor according to claim 1, wherein the coil securing plates are perpendicular to the transitional connecting plate.

3. The linear vibrating motor according to claim 1, wherein the first lateral plate and the fourth lateral plate are parallel to each other and are in parallel with a vibrating direction of the vibrator.

4. The linear vibrating motor according to claim 3, wherein the second lateral plate and the third lateral plate are parallel to each other, and are two lateral plates perpendicular to the vibrating direction of the vibrator of the motor housing; and the fifth lateral plate and the sixth lateral plate are parallel to each other, and are two lateral plates parallel to the vibrating direction of the vibrator of the motor housing.

5. The linear vibrating motor according to claim 4, wherein the first lateral plate is docked with and perpendicular to the fifth lateral plate and the sixth lateral plate;

the second lateral plate is docked with and perpendicular to the fourth lateral plate, the fifth lateral plate and the sixth lateral plate; and the third lateral plate is docked with and perpendicular to the fourth lateral plate, the fifth lateral plate and the sixth lateral plate.

6. The linear vibrating motor according to claim 5, wherein the transitional connecting plate is secured to the fourth lateral plate, the circuit connecting end is located on the outer side of the closed space formed by the first lateral housing and the second lateral housing, and the fourth lateral plate is provided with an extending portion configured to support the circuit connecting end.

7. The linear vibrating motor according to claim 1, wherein the vibrator comprises a mass block and a magnet, and a mounting hole configured to mount the magnet is formed in the mass block.

* * * * *